April 3, 1951 — E. VON BOLHAR — 2,547,185
SHAFT SEAL
Filed May 27, 1947 — 2 Sheets-Sheet 1
FIG_1_
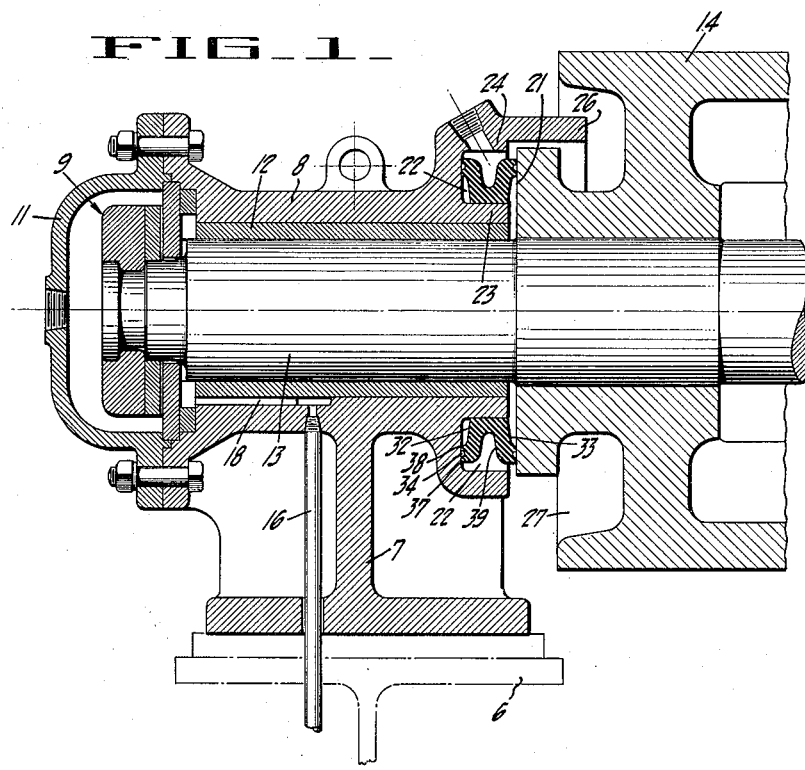
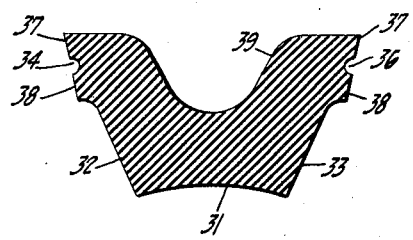
FIG_2_
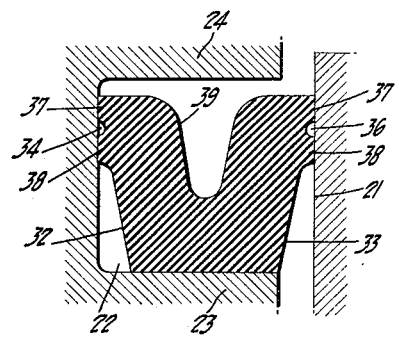
FIG_3_
INVENTOR.
Edgar von Bolhar
BY April 3, 1951     E. VON BOLHAR     2,547,185
SHAFT SEAL
Filed May 27, 1947                          2 Sheets-Sheet 2
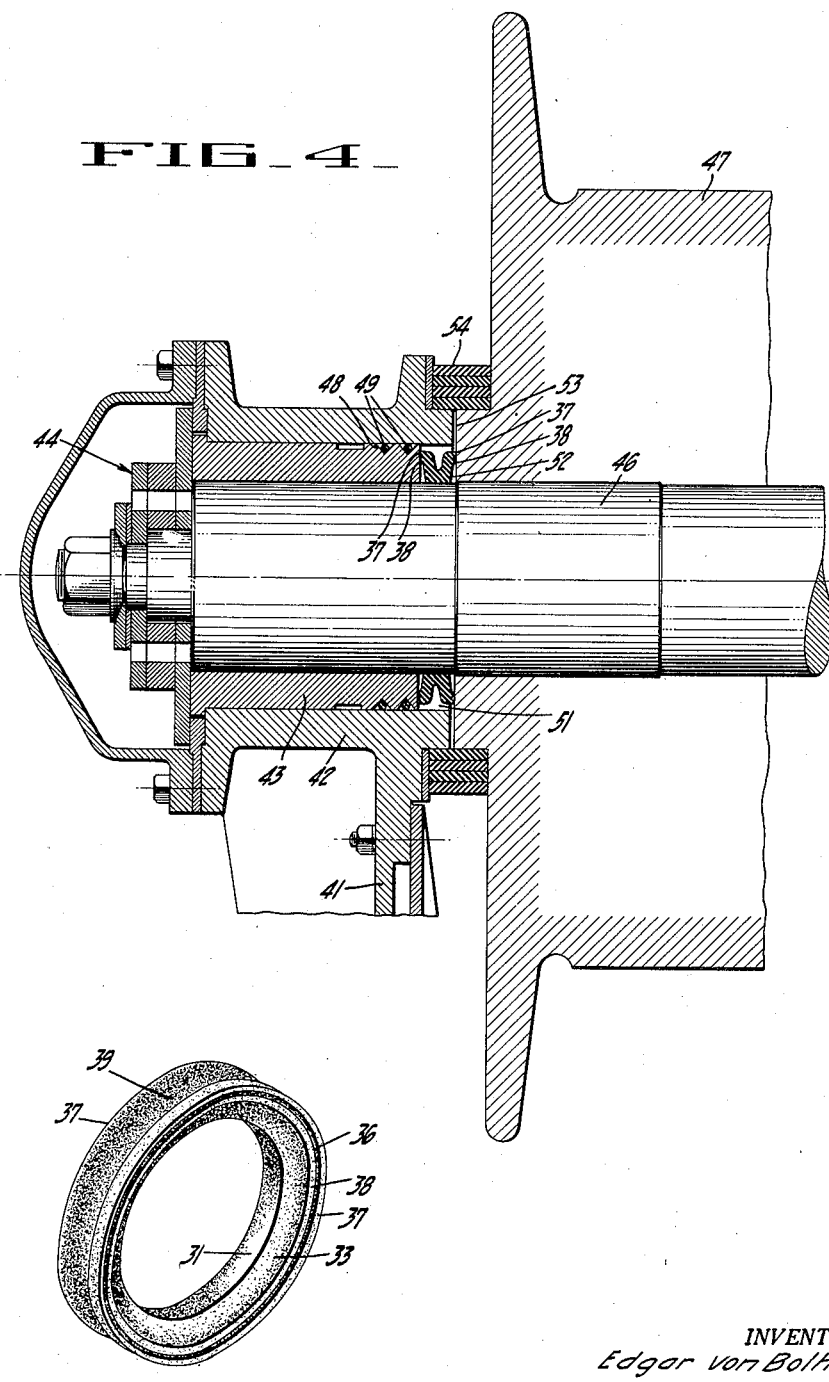
INVENTOR.
Edgar von Bolhar
BY Patented Apr. 3, 1951

2,547,185

UNITED STATES PATENT OFFICE 2,547,185

SHAFT SEAL

Edgar von Bolhar, Sausalito, Calif., assignor to Yuba Manufacturing Company, San Francisco, Calif., a corporation of California Application May 27, 1947, Serial No. 750,736

2 Claims. (Cl. 286—11)

1

My invention relates to means for substantially preventing communication through the narrow space between surfaces that are moving relative to each other, and is especially concerned with means for maintaining the separation of the interior and exterior of bearings, journals, and similar relatively revolving members.

In some machines for example, dredges, much of the machinery must be lubricated with grease or oil yet is immersed at various depths in water for nearly all of its operating life. Lubricant must be kept within the bearings and water must be kept out of them. Furthermore, the water is usually not clean but carries earth, sand, and debris which have a highly injurious effect upon rubbing surfaces such as bearings. Leakage of lubricant is doubly serious for it not only impairs the bearings, but lubricant released into the dredge pond water is highly detrimental since the same water is utilized in the value recovery mechanism and the oil content reduces the amount of recovery.

It is therefore an object of my invention to provide a shaft seal especially for bearings on dredge mechanism effective not only to retain lubricant within the bearing, but also to exclude water, silt, and debris from the rubbing surfaces of the bearing.

Another object of the invention is to provide a seal which is effective over a long period of time despite wear of the parts.

Another object of the invention is to provide a seal which is effective over a wide range of temperature so that whether the dredge is utilized under arctic or tropical conditions, the same design of mechanism and seal can be utilized.

A further object of the invention is to provide a seal which can readily be incorporated in a dredge mechanism of substantially standard or usual design.

A further object of the invention is to provide a seal effective at various depths of submergence.

A further object of the invention is in general to improve shaft seals.

Other objects together with the foregoing are attained in the embodiments of the invention, illustrated in the accompanying drawings, and described in the accompanying description.

In the drawings:

Figure 1 is a cross section of a shaft seal constructed in accordance with my invention.

Figure 2 is a cross section of a seal ring shown in its natural or undeformed or unrestrained condition.

Figure 3 is a cross section similar to Figure 2 but showing the seal ring in its restrained, installed, or deformed condition.

Figure 4 is a cross section comparable to Figure 1 but showing a modified form of shaft seal in accordance with my invention.

Figure 5 is an isometric perspective of a complete seal ring constructed in accordance with my invention, the ring being delineated in its unrestrained or free form.

While the shaft seal of my inventon is subject to numerous modifications in practice depending partially upon the environment in which it is to be utilized and partially upon specialized engineering requirements, it is illustrated herein in two forms both especially adapted for its use in connection with dredging. The form shown in Figure 1 is in connection with a ladder roller bearing for a dredge digging ladder which operates submerged, unsubmerged or both alternately. The environment illustrated in Figure 2 is of a dredge lower tumbler shaft which most always operates in a submerged position.

With especial reference to the form of the invention disclosed in Figures 1, 2, and 3 there is provided a dredge digging ladder frame 6 on which a bearing pedestal 7 is mounted. A somewhat similar pedestal utilizing a similar form of seal is disclosed in my co-pending application entitled "Ladder Roller Mounting," filed April 29, 1947, with Serial Number 744,607, now Patent No. 2,477,221, issued July 26, 1949. The pedestal 7 incorporates an anti-friction journal 8 and an end thrust and locating mechanism 9 disposed within a closure cap 11. The journal is provided with a bearing liner 12 stationary with respect to the pedestal 7 and on which rotates a shaft 13 forming a suitable support on the pedestal for a bucket roller 14. The roller 14 is fast on and revolves with the shaft 13 relative to the bearing 8. In order that the journal may be appropriately lubricated, an oil supply line 16 extends from a convenient point and through the pedestal 7 to communicate with a passageway 18 leading to the relatively moving, rubbing surfaces of the bearing.

In order that the rotating shaft 13 and its attendant roller 14 can be appropriately mounted with respect to the pedestal 7, so that the lubricant for the journal will stay substantially within the pedestal and so that water or other surrounding medium will not enter into the bearing, there is provided a special seal mechanism. For that reason the roller 14 is provided with a radial or transverse planar surface 21 which is effective almost entirely to enclose and to overlie an annular recess 22 formed in the pedestal 7 surrounding the bearing 8 and thus affording an inner shoulder 23 and an outer shoulder 24. A lip 26 extends from the pedestal into an annular depression 27 in the roller 14 to act as a rock guard over the joint.

In accordance with my invention, I dispose a special sealing ring within the recess 22. This ring as especially illustrated in Figure 5 and as shown in cross section in Figure 2 is an annulus constructed preferably of a deformable material such as natural or artificial rubber of a composition to retain its major properties over a wide temperature range. The ring is of a symmetrical contour in part defined by an arcuate base line 31 extending to dihedrally diverging side walls 32 and 33, these in turn merging with surfaces containing a pair of peripheral grooves 34 and 36 disposed between flanges 37 and 38. The remaining portion of the ring cross section is defined by a re-entrant surface 39 establishing a peripheral exterior groove.

The general size, proportions and cross sectional contour of the ring as moulded or when it is in its free condition are substantially as shown in Figure 2. But the ring is designed in use to occupy a deformed position substantially as shown in Figure 3 as it is confined or restrained within the annular recess 22. The dimensions between the relatively moving surface 21 and the opposite wall of the groove are such that when the ring is installed therein, its base 31 becomes substantially a circular cylinder in rather tight frictional gripping engagement with the shoulder 23. The deformation of the restrained ring is likewise such that the flanges 37 and 38 on one side are then approximately in a radial plane so as to abut against the inner surface of the recess 22 while the flanges on the other side adjacent the groove 36 are likewise in a parallel radial plane in abutment with the radial surface 21. The re-entrant groove 39 affords a space for the deformation of the material of the ring to permit it to assume its confined configuration.

With this arrangement the ring is stationary on the inner shoulder 23 in the recess of the pedestal and the flanges 37 and 38 on its outboard edge rub against the revolving radial surface 21 of the roller 14. The effect of this is that the pliant flanges 37 and 38 are pressed against the surface by the resiliency or springiness of the material in part deforming into the groove 36 and hence affording a tight seal. The deeper under the surface of the dredge pond the roller 14 is submerged, the greater is the hydrostatic pressure against the outside of the ring tending to press the flanges 37 and 38 on both sides against their adjacent walls. In this way the seal becomes tighter against external encroachment as the pressure becomes greater. The lubricant within the bearing is normally retained by the seal due to its own resiliency but if an excessive pressure during lubrication is imposed upon the seal the flanges 37 and 38 yield momentarily to prevent undue lubrication pressures within the bearing. Normally, however, the oil or other lubricant is entirely retained.

In this form of the shaft seal of my invention there is provided a structure, especially effective for dredges, for retaining the lubricant in the bearings under normal conditions and for precluding the influx of surrounding water into the bearing.

In the form of seal shown in Figure 4, while the general structure is substantially the same, there are some minor differences. In this instance, the lower end of the ladder frame 41 carries a journal mounting 42 within which a bearing 43 is disposed. An end construction 44 locates the bearing appropriately and receives thrust from a shaft 46 on which the dredge bucket line lower tumbler 47 is mounted. The tumbler and the shaft revolve in unison within the bearing 43. Since the bearing 43 is relatively large it is maintained against fluid leakage to or from the thrust end 44. This is accomplished by exterior V-grooves 48 turned in it to receive O-rings 49. Leakage in an axial direction is precluded.

In accordance with the invention the pedestal 42 or journal is of somewhat greater length than the bearing 43 so that there is provided an annular cavity 51 within which a sealing ring 52 of the configuration shown in Figures 2, 3, and 5 is disposed. In this instance the interior periphery of the ring is such that it is a tight or snug fit on the shaft 46 and consequently it rotates with the shaft. The annular rings or flanges 37 and 38 bear respectively upon an end of the stationary bearing 43 and upon a radial surface 53 on the lower tumbler 47.

In addition to the seal so provided, the bearing mounting 42 and the tumbler 47 are turned with alined hubs so that circumferential rubber straps 54 encircling the hubs assist in keeping out larger particles of debris in the surrounding water, and also assist somewhat in keeping out water and retaining lubricant.

The main barrier, however, to flow into or out of the bearing is the ring 52. In this instance the ring does not rub against the face 53 of the lower tumbler, but rather rubs against the end of the bearing 43, being urged into that relationship by the inherent resiliency of the material of the ring and likewise by the pressure of any water leaking from outside past the bands 54. Since the tumbler 47 is nearly always submerged and is sometimes very close to the lowest point of operation, the pressure upon the bands 54 and externally upon the ring 52 varies with the depth of the tumbler. As the tendency to leak is increased, the pressure forcing the ring 52 into abutment with its mating surface is correspondingly increased. At the same time, if pressure upon the bearing during lubrication is excessive, the ring 52 can yield permitting the excess to escape although under normal conditions and pressures of operation, the seal is effective to prevent outflow of lubricant.

I claim:

1. In combination, a shaft seal and a first element having a surface cylindrical about an axis and a radial surface and a second element having a radial surface opposite to and substantially parallel with said first-mentioned radial surface, said elements being relatively rotatable about said axis, said seal comprising a resilient ring having in axial cross section when free an arcuately curved base and oppositely facing, radially outwardly diverging exterior flanges with an annular groove between said flanges and when deformed by the distortion of said base into a right cylinder fitting said cylindrical surface having said oppositely facing exterior flanges consequently distorted into substantial parallelism and engaging said radial surfaces in locations radially outward from said base.

2. In combination, a shaft seal and a first element having a surface cylindrical about an axis and a radial surface and a second element having a radial surface opposite to and substantially parallel with said first-mentioned radial surface, said elements being relatively rotatable about said axis, said seal comprising a deformable ring when free having a concave inner face and a grooved outer face and radially outwardly diverging lateral faces merging with radially outwardly diverging external side flanges and when deformed by the distortion of said inner face into a cylinder fitting said cylindrical surface consequently having radially outwardly diverging lateral faces merging with substantially parallel external side flanges, each of said external side flanges having a groove therein, said external side flanges of said seal engaging respectively the radial surfaces of said first and second elements.

EDGAR von BOLHAR.

REFERENCES CITED

The following references are of record in the file of this patent:

UNITED STATES PATENTS

| Number | Name | Date |
|---|---|---|
| 1,931,733 | Leibing | Oct. 24, 1933 |
| 2,039,009 | Lampman et al. | Apr. 28, 1936 |
| 2,173,075 | Nelson | Sept. 12, 1939 |
| 2,210,823 | Victor et al. | Aug. 6, 1940 |
| 2,367,403 | Kosatka | Jan. 16, 1945 |
| 2,373,443 | Armington | Apr. 10, 1945 |
| 2,415,888 | Joy | Feb. 18, 1947 |

FOREIGN PATENTS

| Number | Country | Date |
|---|---|---|
| 462,424 | France | of 1914 |